US011149520B2

(12) United States Patent
Barfoot et al.

(10) Patent No.: US 11,149,520 B2
(45) Date of Patent: Oct. 19, 2021

(54) MITIGATION OF ATTENUATION FOR FIBER OPTIC SENSING DURING CEMENTING

(71) Applicant: Halliburton Energy Services, Inc., Houston, TX (US)

(72) Inventors: David Andrew Barfoot, Houston, TX (US); Christopher Lee Stokley, Houston, TX (US); John Laureto Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 84 days.

(21) Appl. No.: 16/323,421

(22) PCT Filed: Sep. 22, 2016

(86) PCT No.: PCT/US2016/053113
§ 371 (c)(1),
(2) Date: Feb. 5, 2019

(87) PCT Pub. No.: WO2018/056985
PCT Pub. Date: Mar. 29, 2018

(65) Prior Publication Data
US 2020/0041686 A1    Feb. 6, 2020

(51) Int. Cl.
*E21B 33/14* (2006.01)
*E21B 47/005* (2012.01)

(52) U.S. Cl.
CPC .......... *E21B 33/14* (2013.01); *E21B 47/005* (2020.05)

(58) Field of Classification Search
CPC ......... G01V 8/16; E21B 33/14; E21B 47/005; E21B 47/135
See application file for complete search history.

(56) References Cited

U.S. PATENT DOCUMENTS 6,281,489 B1 * 8/2001 Tubel .................. E21B 41/02
  250/227.14
6,302,203 B1 * 10/2001 Rayssiguier .......... E21B 17/003
  166/250.01

(Continued)

FOREIGN PATENT DOCUMENTS

WO    WO-0171155 A1 * 9/2001 ............. E21B 43/10
WO    2014/099066 A1    6/2014
WO    WO-2015065479 A1 * 5/2015 ......... H04B 10/5161

OTHER PUBLICATIONS

International Search Report and Written Opinion issued in related PCT Application No. PCT/US2016/053113 dated Jun. 8, 2017, 16 pages.

*Primary Examiner* — Blake E Michener
*Assistant Examiner* — Theodore N Yao
(74) *Attorney, Agent, or Firm* — Thomas Rooney; Baker Botts L.L.P.

(57) ABSTRACT

A cementing tool with a top seal and a bottom seal may be positionable within a casing string of a wellbore. A fiber optic line may be coupled to the top seal and to a second fiber optic line coupled to a bottom seal that is deployed within an annulus. An amplifier coupled to the cementing tool may amplify a source optical signal from a light source and a sensing measurement signal from the second fiber optic line and the first fiber optic line. One or more operational parameters, such as cementing parameters, may be adjusted based, at least in part, on the sensing measurement signal.

20 Claims, 3 Drawing Sheets

(56) References Cited

U.S. PATENT DOCUMENTS

| | | | |
|---|---|---|---|
| 8,305,228 B2 | 11/2012 | Vigneaux | |
| 8,408,064 B2 | 4/2013 | Hartog et al. | |
| 2004/0045705 A1* | 3/2004 | Gardner | E21B 47/135 |
| | | | 166/250.01 |
| 2004/0047534 A1* | 3/2004 | Shah | E21B 23/14 |
| | | | 385/12 |
| 2004/0060697 A1* | 4/2004 | Tilton | E21B 47/09 |
| | | | 166/253.1 |
| 2004/0109228 A1* | 6/2004 | Aronstam | G01D 5/353 |
| | | | 359/341.3 |
| 2008/0272931 A1* | 11/2008 | Auzerais | E21B 47/135 |
| | | | 340/854.7 |
| 2011/0079401 A1* | 4/2011 | Gambier | E21B 23/14 |
| | | | 166/384 |
| 2012/0073805 A1 | 3/2012 | Shampine et al. | |
| 2013/0021874 A1 | 1/2013 | Hartog et al. | |
| 2014/0034301 A1 | 2/2014 | LeBlanc | |
| 2014/0196893 A1* | 7/2014 | Vigneaux | E21B 47/12 |
| | | | 166/250.07 |
| 2018/0245424 A1* | 8/2018 | Stokley | E21B 33/16 |
| 2018/7024542 | 8/2018 | Stokley et al. | |

* cited by examiner

MITIGATION OF ATTENUATION FOR FIBER OPTIC SENSING DURING CEMENTING

CROSS-REFERENCE TO RELATED APPLICATION

The present application is a U.S. National Stage Application of International Application No. PCT/US2016/053113 filed Sep. 22, 2016, which is incorporated herein by reference in its entirety for all purposes.

TECHNICAL FIELD

The present disclosure relates generally to systems and methods for completing a wellbore, and more specifically (although not necessarily exclusively), to systems and methods for wellbore monitoring using distributed fiber optic sensing.

BACKGROUND

During completion of the wellbore the annular space between the wellbore wall and a casing string (or casing) may be filled with cement. This process can be referred to as "cementing" the wellbore. A lower plug can be inserted into the casing string after which cement can be pumped into the casing string. An upper plug can be inserted into the wellbore after a desired amount of cement has been injected. The upper plug, the cement, and the lower plug can be forced downhole by injecting displacement fluid into the casing string. In some instances, the upper plug may be attached to a fiber. The length of the fiber may create performance issues with downhole or sensing measurements during wellbore completion.

DETAILED DESCRIPTION

Certain aspects and features of the present disclosure relate to a wellbore monitoring using distributed fiber optic sensing. Deployment of a fiber optic line by using a spooled fiber coupled to a seal provides a low cost way to monitor completion of a wellbore. The wellbore may include a casing string that includes one or more casing collars. The cementing tool, for example a seal, cement plug or a dart, may be positioned within the casing string. The cementing tool may include a top seal and a bottom seal. An optical line may also be attached to the bottom seal and may be deployed into the wellbore annulus using a bottom seal bobbin system. The optical signal traversing the fiber optic line is amplified at the top seal, for example, the top cement wiper dart. By amplifying the optical signal, the signal fidelity of sensor measurements within the wellbore annulus is increased without losses from nonlinear optical effects such as stimulated Brillouin scattering.

The light source may be coupled to a fiber optic line that can extend to the surface. The fiber optic line may be dispensed on one or both ends by a fiber optic dispenser such as a bobbin or reel. The fiber optic line may transmit the pulse of light to a receiver, for example a photodetector, positioned at the surface. The receiver can detect the arrival of the pulse of light. In some aspects, the receiver can transmit information regarding the light pulses to a device located away from the wellbore surface.

The fiber optic line may be dispensed (or unspooled) at one end by a fiber optic dispenser such as a reel or bobbin positioned proximate to the cementing tool. An additional fiber optic dispenser may be positioned proximate to the surface of the wellbore and can also unspool additional lengths of the fiber optic line. The fiber optic dispensers may dispense the additional lengths of fiber optic line in response to a tension in the fiber optic line exceeding a pre-set value or a threshold. The fiber optic dispensers may prevent the fiber optic line from breaking or otherwise becoming damaged as the cementing tool coupled to the fiber optic line travels downhole. The fiber optic line may be unarmored, which may increase the amount of cable that can be spooled on the reels. The fiber optic line may be a sacrificial cable that remains within the wellbore until it, ultimately, is destroyed during wellbore operations, for example during stimulation.

In one or more embodiments, the fiber optic line itself may be a sensor. In one or more embodiments, additional sensors may be coupled to the fiber optic line for monitoring various conditions within the wellbore. An additional sensor may include, but is not limited to, a temperature sensor, an acoustic sensor, a pressure sensor, a chemical sensor, an accelerometer, or other sensors for monitoring a condition within the wellbore. These sensors may transmit information about the wellbore conditions to the surface via the fiber optic line.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
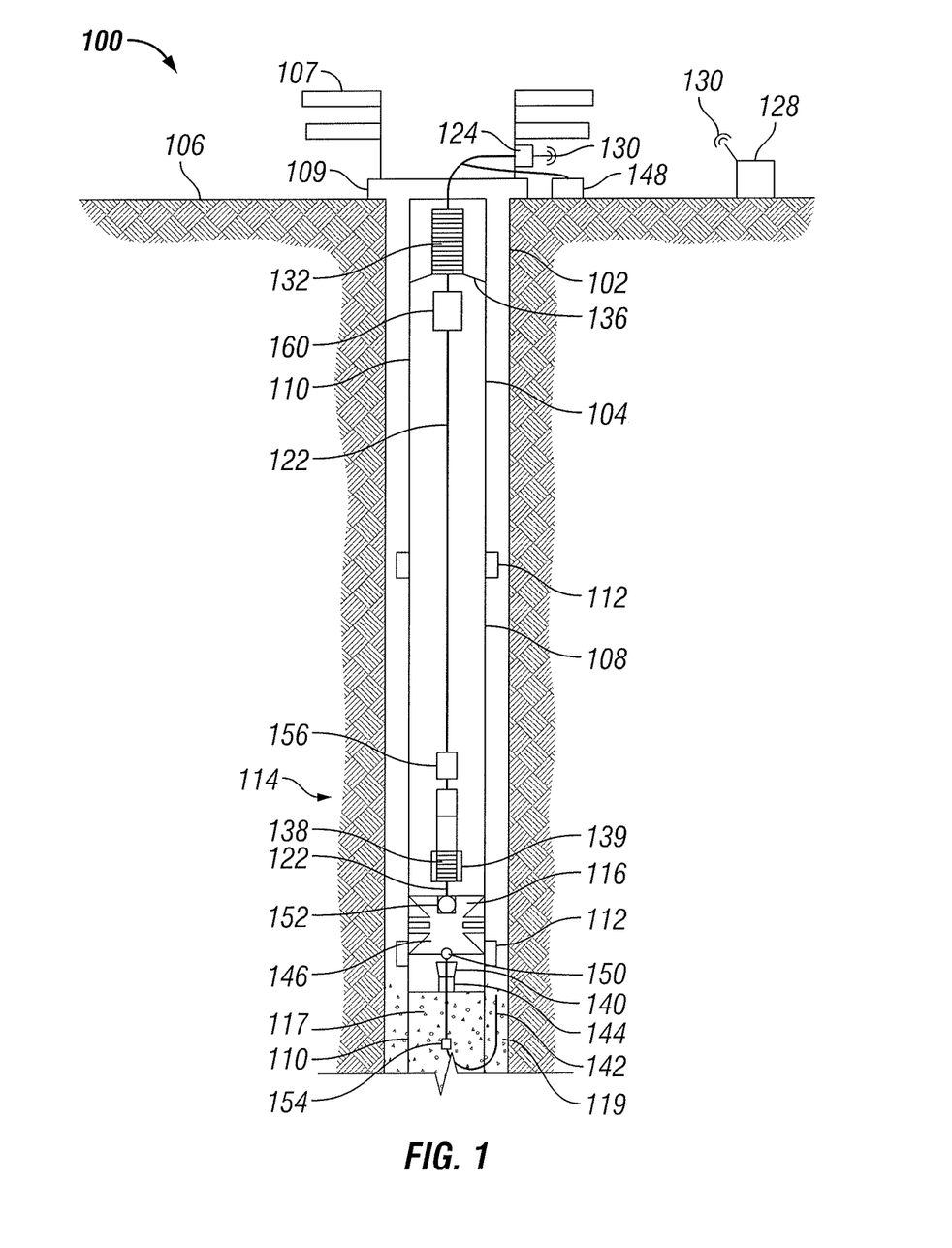
FIG. 1 is a schematic diagram of a well system for deploying a cementing tool that uses fiber optic telemetry for obtaining downhole measurements during completion of a wellbore, according to one or more aspects of the present disclosure.

FIG. 1 is a schematic diagram of a well system 100 for deploying a cementing tool that uses fiber optic telemetry for obtaining downhole measurements during completion of a wellbore. The well system 100 may include a wellbore 102 with a casing string 104 extending from the surface 106 through the wellbore 102. A blowout preventer 107 ("BOP") can be positioned above a wellhead 109 at the surface 106. The wellbore 102 extends through various earth strata or layers and may have a substantially vertical section 108. In some aspects, the wellbore 102 can also include a substantially horizontal section. The casing string (or casing) 104 includes multiple casing tubes 110 coupled together end-to-end by casing collars 112. In some aspects, the casing tubes 110 are approximately thirty feet in length. The substantially vertical section 108 may extend through any hydrocarbon bearing subterranean formation, for example, hydrocarbon bearing subterranean formation 114.

A cementing tool, for example a top seal 116 and a bottom seal 146, may be positioned downhole in the casing string 104. Initially, a bottom seal 146 may be positioned below the cement 117 and may be forced downhole prior to deployment of the top seal 116 until the bottom seal 146 rests, for example, on a floating collar at the bottom of the casing string 104. The bottom seal 146 includes an opening so that cement 117 may be pumped into the wellbore 102. The top seal 116 may be an upper seal that is inserted into the casing string 104 after a desired amount of cement 117 has been injected into the casing string 104. In some aspects, a dart, plug, or any other device for plugging a cement plug may be used in place of the top seal 116. The top seal 116 may be forced downhole by the injection of displacement fluid from the surface 106. The top seal 116 may be forced downhole until it contacts or wet connects the bottom seal 146 and forms a seal such that cement 117 may not flow back up the casing tube 110. The top seal 116 may force the cement 117 downhole until it ruptures the bottom seal 146 and is forced out of a shoe of the casing string 104. The cement 117 may flow out of the casing string 104 and into the annulus 119 of the wellbore 102. Knowing downhole measurements while cementing within the wellbore 102 may prevent errors in the cementing process and may increase the integrity of the well.

In some aspects, a light source 148 may be positioned proximate to the surface 106 and may transmit an optical signal downhole to obtain one or more downhole measurements. In one or more embodiments, the light source 148 may be located within the wellbore 102 or positioned elsewhere at the surface 106. The light source 148 may be a high repetition pulse laser or other suitable light source. The light source 148 may generate an optical signal, for example, a series of light pulses that are transmitted by the top fiber optic line 122. The optical signal generated by the light source 148 may travel the length of the top fiber optic line 122 to the bottom fiber optic line 142. The light source 148 may be coupled to a top fiber optic line 122 which is dispensed from an upper fiber optic dispenser 132. In one or more embodiments, an upper fiber optic dispenser 132 may be a bobbin or a reel. A sensing measurement signal may be transmitted to a fiber optic interrogation system 160 coupled to the top fiber optic line 122 located within the wellbore 102 or at the surface 106. The sensing measurement signal comprises information associated with one or more detected downhole parameters or conditions. For example, in one or more embodiments, the receiver 124 may be located within or separately from a fiber optic interrogation system 160 where the receiver 124 may be positioned at the surface 106 and may receive a sensing measurement signal from a top fiber optic line 122, a bottom fiber optic line 142, or both. The receiver 124 and the fiber optic interrogation system 160 may be located at any position suitable for receiving the sensing measurement signal or transmitting signals downhole via the top fiber optic line 122. The receiver 124 may be an optical receiver, for example a photodetector that may convert the sensing measurement signal into electricity. The sensing measurement signal may convey information about any one or more downhole parameters.

In one or more embodiments, the receiver 124 may be communicatively coupled to a computing device 128 located away or remotely from the wellbore 102 by a communication link 130. In one or more embodiments, the receiver 124 may comprise an optical receiver coupled to an electronic circuit (not shown) (for example, an electronic amplifier, filter, or other circuit) which is coupled to a control system (not shown) for pumping cement, for example, into the wellbore 102. The receiver 124 may be part of a fiber optic interrogation system 160 or coupled to a fiber optic interrogation system 160. The communication link 130 may be a wireless communication link. The communication link 130 may include wireless interfaces such as IEEE 802.11, Bluetooth, or radio interfaces for accessing cellular telephone networks (for example, transceiver/antenna for accessing a CDMA, GSM, UMTS, or other mobile communications network). In one or more embodiments, the communication link 130 may be wired. A wired communication link may include interfaces such as Ethernet, USB, IEEE 1394, or a fiber optic interface. The receiver 124 may transmit information related to the sensing measurement signal, for example but not limited to the light pulse count, the time the light pulse arrived, or other information, to the computing device 128. In some aspects, the receiver 124 may be coupled to a transmitter that communicates with the computing device 128.

The top fiber optic line 122 and the bottom fiber optic line 142 transmit the light pulse to and from the receiver 124 may be an unarmored fiber, an armored fiber, or any other type of fiber or fiber optic line. The unarmored fiber may include a fiber core and a cladding but no outer buffer. In some aspects, the top fiber optic line 122 and bottom fiber optic line 142 may be an armored fiber. The armored fiber may include a fiber core, a cladding, and an outer buffer. The inclusion of the outer buffer may increase the diameter of the fiber optic cable. The top fiber optic line 122 and the bottom fiber optic line may be a multi-mode or single-mode optical fiber. The top fiber optic line 122 and the bottom fiber optic line 142 may include one or more optical fibers. The top fiber optic line 122 and the bottom fiber optic line 142 may be a sacrificial line that is not retrieved from the wellbore 102 but instead remains in the wellbore 102 until it is destroyed. For example, the top fiber optic line 122 and bottom fiber optic line 142 may be destroyed during stimulation of the wellbore 102. In one or more embodiments, only the bottom fiber optic line 142 is sacrificed. The top fiber optic line 122 and the bottom fiber optic line 142 may be coated to reduce or eliminate exposure to hydrogen which is well known to cause hydrogen darkening in fiber optic lines. The coating may be, for example, graphene oxide.

The top fiber optic line 122 may be dispensed from an upper fiber optic dispenser 132 positioned within the wellbore 102 proximate to the surface 106 as the top seal 116 is forced downhole. In one or more embodiments, the upper fiber optic dispenser 132 may be a bobbin, a reel, a spool or any other device for releasing the top fiber optic line 122. In some aspects, the upper fiber optic dispenser 132 may be positioned at the surface 106, for example proximate to the blowout preventer 107. The upper fiber optic dispenser 132 may be secured within the wellbore 102 by a securing device, for example by spring loaded camming feet 136 or other suitable securing mechanisms. The upper fiber optic dispenser 132 may have a zero tension payout that can dispense the top fiber optic line 122 when a tension in the top fiber optic line 122 increases beyond zero. For example, the upper fiber optic dispenser 132 may dispense more fiber optic line 122 when tension in the fiber optic line 122 increases above a pre-determined limit.

The top fiber optic line 122 may be tensioned by and pulled along with the displacement fluid being injected into the casing string 104 to move the top seal 116. The upper fiber optic dispenser 132 may dispense additional lengths of the top fiber optic line 122 as the top fiber optic line 122 is tensioned by the displacement fluid injected into the wellbore 102. In some aspects, the top fiber optic line 122 may spool off the upper fiber optic dispenser 132 at the same rate as the flow of the displacement fluid. The upper fiber optic dispenser 132 may prevent the top fiber optic line from breaking or otherwise becoming damaged as the top fiber optic line 122 and the top seal 116 travel downhole.

The top fiber optic line 122 may also be spooled on and dispensed from a lower fiber optic dispenser 138 coupled to the top seal 116. The lower fiber optic dispenser 138 may dispense the top fiber optic line 122 in the same manner as the upper fiber optic dispenser 132. The lower fiber optic dispenser 138 may include a drag device 139. The drag device 139 may allow the lower fiber optic dispenser 138 to dispense the top fiber optic line 122 only when a pre-set tension or a threshold in the top fiber optic line 122 is reached. The lower fiber optic dispenser 138 may prevent the top fiber optic line 122 from breaking or otherwise becoming damaged as the top fiber optic line 122 and the top seal 116 travel downhole. The upper fiber optic dispenser 132 and the lower fiber optic dispenser 138 may store greater lengths of unarmored fiber optic cable than armored fiber optic cable. In one or more embodiments, only one, either or both of the upper fiber optic dispenser 132 or the lower fiber optic dispenser 138 are utilized. Utilization of both the upper fiber optic dispenser 132 and the lower fiber optic dispenser 138 may be beneficial when a wellbore 102 includes a bent or highly deviated heel or has a curve or becomes horizontal. The upper fiber optic dispenser 132 and the lower fiber optic dispenser 138 may prevent the top fiber optic line 122 from breaking, chaffing, or otherwise becoming damaged as the top seal 116 and the top fiber optic line 122 are forced around a curve into a horizontal or lateral wellbore. In one or more embodiments, the top fiber optic line 122 may be actively dispensed from the upper fiber optic dispenser 132 or a lower fiber optic dispenser 138 by a motor (not shown). In some aspects, one or both of the upper fiber optic dispenser 132 and the lower fiber optic dispenser 138 may utilize soft high-temperature rated polymer cements or binders to hold the top fiber optic line 122 turns together around the fiber optic dispenser 138. As the top fiber optic line 122 spooled on the applicable fiber optic dispenser is dispensed by the increased tension in the line, the fiber optic line 122 may be peeled from the outermost layer of the applicable fiber optic dispenser.

A bottom seal 146 may include a bottom fiber optic line 146. During the process of moving the top seal 116 down the wellbore 102, cement 117 is displaced into the annulus 119 forcing the bottom fiber optic line 142 to be carried by the flow of cement 117 into the annulus 119. The bottom fiber optic dispenser 144 is coupled to the bottom fiber optic line 142 and allows for regulated deployment of the bottom fiber optic line 142 such that the bottom fiber optic line 142 does not become tangled. The bottom fiber optic dispenser 144 may dispense bottom fiber optic line 142 in the same manner as that of the upper fiber optic dispenser 132 or the lower fiber optic dispenser 138. The bottom fiber optic dispenser 144 may be a bobbin, a reel, a spool or any other device for releasing the bottom fiber optic line 142. When the top seal 116 wet connects or mates to the bottom seal 146, the top fiber optic line 122 may couple to the bottom fiber optic line 142 via a coupler 150 or in any other way known to one of ordinary skill in the art such that the optical signals from the bottom fiber optic line 142 are transmitted to the top fiber optic line 122 for conveyance to a fiber optic interrogation system 160 and then to receiver 124 for processing by an information handling system such as computing device 128. In one or more embodiments, a fiber optic interrogation system 160 is not utilized and the top fiber optic line 122 continues to a suitable device for processing such as receiver 124 or computing device 128.

The top fiber optic line 122 may create impairments to any sensing performed downhole due to attenuation and non-linear optical interaction in the top fiber optic line 122 due to increased interaction length. To mitigate the issue of extra line, a mid-stage amplifier (such as top amplifier 152) may be placed inside or coupled to the top seal 116 and may be used to boost the sensing measurement signal, for example, to boost either the interrogation signal or the backscatter return signal or both. In one or more embodiments, a bottom amplifier 140 may be located within or coupled to the bottom seal 146. In one or more embodiments, the top amplifier 152, the bottom amplifier 140 or both may comprise a doped fiber, for example, an Erbium-doped fiber. In one or more embodiments, the top amplifier 152, the bottom amplifier 140 or both may comprise an amplified spontaneous emission (ASE) filter. The doped fiber may be remotely pumped from a surface light source 148 to provide optical amplification of light signals, for example, the sensing measurement signals, travelling through the top fiber optic line 122, the bottom fiber optic line 142 or both.

In one or more embodiments, a surface laser may be used as the light source 148. For example, a surface laser at 980 nanometers (nm) or 1480 nm may be used to remotely pump the gain medium. Optical signals with a wavelength in the gain spectrum of Erbium (approximately 1530 to 1570 nm) will be amplified as they pass through the Erbium doped fiber section within the top seal 116, the bottom seal 146 or both. Other optical amplification mediums may be used with a remote pump for other wavelengths bands, for example, Ytterbium for operation near 1 micrometer (μm) or Thulium for operation near 2 μm.

In one or more embodiments, any number of sensors 156 may be coupled to the top fiber optic line 122 and any number of sensors 154 may be coupled to the bottom fiber optic line 142. The sensors 154 and 156 may monitor any number of downhole parameters or conditions within the wellbore 102. In some aspects, the sensors 154 and 156 may be a temperature sensor, an acoustic sensor, a sheer sensor, a pressure sensor, an accelerometer, a chemical sensor, or other suitable sensor. The sensors 154 and 156 may monitor a downhole parameter or condition within the wellbore 102 and transmit information regarding the parameter or condition to the receiver 124 (or fiber optic interrogation system 160) via the top fiber optic line 122. In some aspects, the receiver 124 may include a transmitter for transmitting commands to the sensors 154 and 156 via the bottom fiber optic line 142 and the top fiber optic line 122, respectively.

Figure 2:
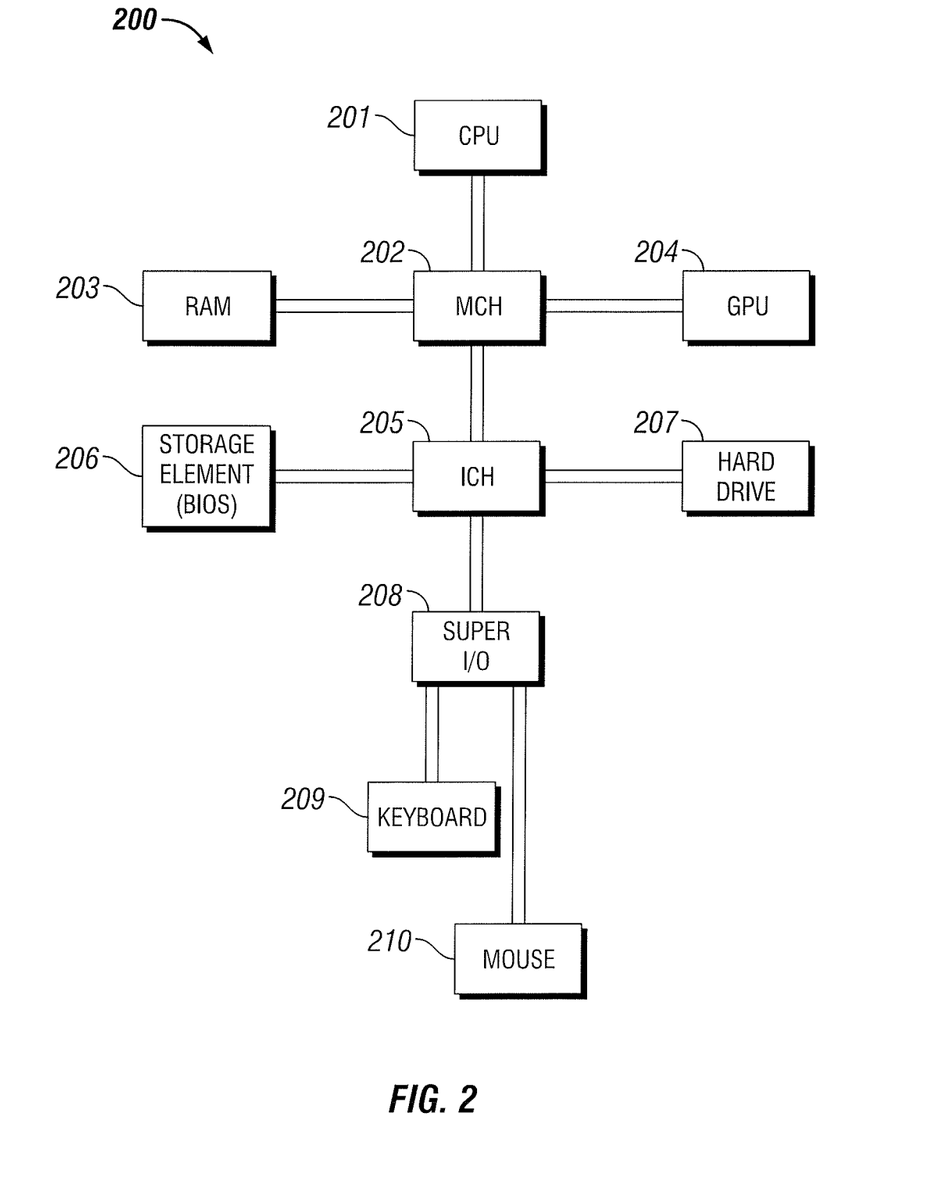
FIG. 2 is a diagram illustrating an example information handling system, according to one or more aspects of the present disclosure.

FIG. 2 is a diagram illustrating an example information handling system 200, according to aspects of the present disclosure. The computing device 128 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

In certain embodiments, the computing device 128 may comprise an information handling system 200 with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 3:
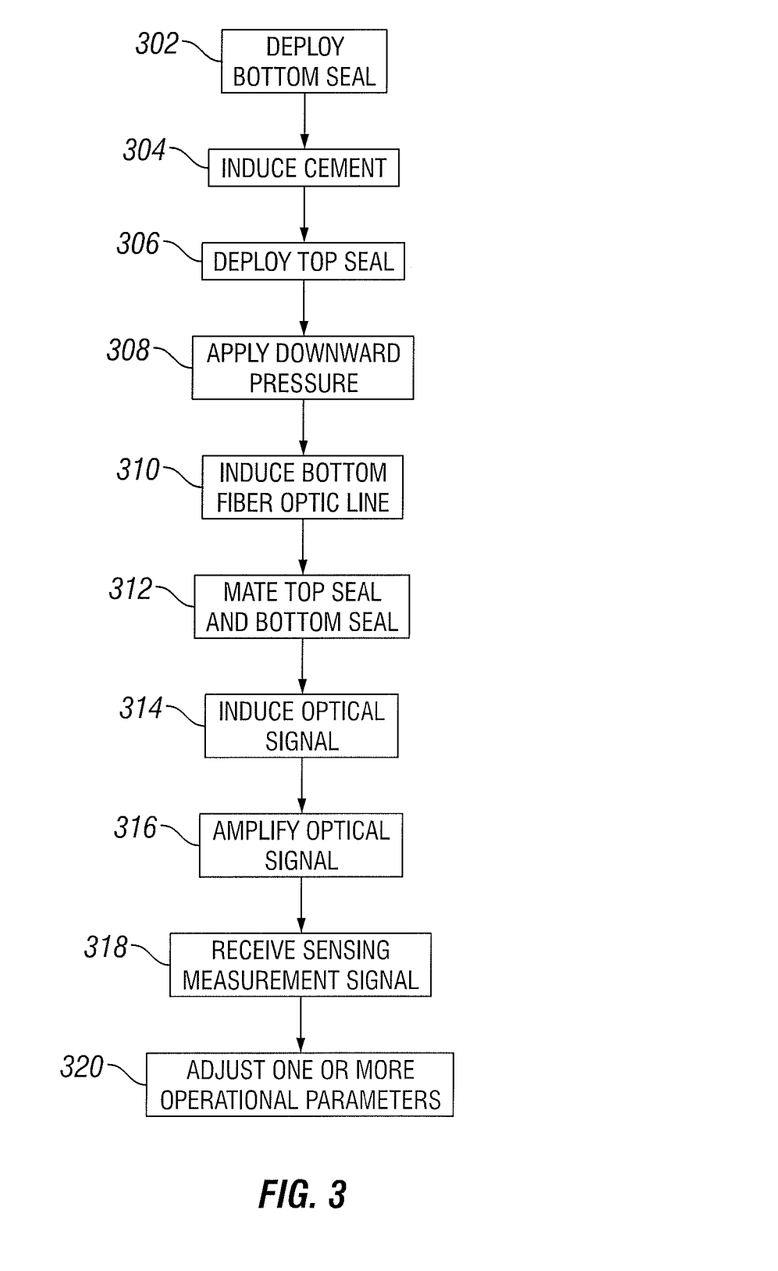
FIG. 3 is a flowchart for a method of using a fiber optic line coupled to a cementing tool to receive downhole measurements, according to one or more aspects of the present disclosure.

FIG. 3 is a flowchart that illustrates a method of using a cement tool to obtain one or more downhole parameters. At step 302 a bottom seal 146 of a cement tool is deployed in a casing string 104 of the wellbore 102. The bottom seal 146 comprises a bottom fiber optic line 142. At step 304, cement 117 is induced into the casing string 104. As cement 117 is induced into the casing string 104, the bottom fiber optic line 142 is forced or pulled into the annulus 119. The cement 117 is forced through an aperture or opening in the bottom seal 146 into the casing string 104 an annulus 119.

At step 306, a top seal 116 of a cement tool is deployed in the casing string 104. A top fiber optic line 122 is coupled to the top seal 116. At step 308, a downward pressure is applied on the cement 117 by the top seal 116 that forces the cement 117 to flow through the bottom seal 146 into the annulus 119. The top seal 116 may be forced down the casing string 104 by a displacement fluid. The rate of the displacement fluid may be monitored by a computing device 128 and one or more parameters associated with the displacement fluid may be sensed by one or more sensors 156 on the top fiber optic line 122 and transmitted via a fiber optic interrogation system 160 to the computing device 128.

At step 310 the bottom fiber optic line 142 is induced into the annulus 119 by the downward pressure applied from the cement 117. At step 314, the top seal 116 mates with the bottom seal 146. A coupler coupled to the top seal 116, the bottom seal 146 or both couples the top fiber optic line 122 and the bottom fiber optic line 142 once the top seal 116 and the bottom seal 146 have been mated. The top seal 116 and the bottom seal 146 form a tight seal such that the cement 117 cannot flow back up the casing string 104.

At step 314, a light source 148 coupled to the top fiber optic line 122 induces an optical signal into the top fiber optic line 122. At step 316, the optical signal from the light source 148 is amplified by an amplifier, for example, top amplifier 152, a bottom amplifier 140 or both. At step 318, a sensing measurement signal associated with a downhole parameter is received. In one or more embodiments, the top amplifier 152, the bottom amplifier 140 or any combination thereof amplifies the sensing measurement signal. The sensing measurement signal traverses the bottom fiber optic line 142 and the top fiber optic line 122. The sensing measurement signal may be received at a computing device 128 directly from the top fiber optic line 122, a fiber optic interrogation system 160, a receiver 124 or any combination thereof.

At step 320, one or more operational parameters are adjusted based, at least in part, on the received sensing measurement signal. The one or more operational parameters may include, but are not limited to, cement flow rate, pumped volume, density, composition, and hydraulic pressure. For example, one or more parameters associated with the cementing of the casing string 104 may be adjusted.

In one or more embodiments, a system comprises a cementing tool positionable within a casing string of a wellbore, wherein the cementing tool comprises a top seal and a bottom seal, and wherein the top seal and the bottom seal are configured to be mated, an amplifier coupled to the cementing tool, a top fiber optic line coupled to the top seal, wherein the top fiber optic line couples to the bottom seal when the top seal and the bottom seal are mated, a bottom fiber optic line coupled to the bottom seal, wherein the bottom fiber optic line is carried into an annulus by a flow of cement into the wellbore, a light source, wherein the light source generates a source optical signal through the top fiber optic line, wherein the amplifier amplifies the source optical signal, and wherein the amplified source optical signal flows through the bottom fiber optic line when the top seal and the bottom seal are mated, and a receiver for receiving a sensing measurement signal transmitted from the bottom fiber optic line to the top fiber optic line, wherein the sensing measurement signal is associated with a downhole parameter. In one or more embodiments the system further comprises an information handling system coupled to the top seal fiber optic line, wherein the information handling receives the sensing measurement signal. In one or more embodiments, the system further comprises a fiber optic interrogation system coupled to the top seal fiber optic line, wherein the fiber optic interrogation system transmits the sensing measurement signal to an information handling system. In one or more embodiments, the top seal comprises the amplifier. In one or more embodiments, the bottom seal comprises the amplifier. In one or more embodiments, the amplifier comprises a first amplifier and a second amplifier, and wherein the top seal comprises the first amplifier and the bottom seal comprises the second amplifier. In one or more embodiments, the amplifier comprises a doped fiber and an amplified spontaneous emission (ASE) filter. In one or more embodiments, the amplifier amplifies the sensing measurement signal.

In one or more embodiments, a method of cementing a wellbore using a cement tool comprises deploying a bottom seal of the cement tool in a casing of the wellbore, wherein the bottom seal comprises a bottom fiber optic line, and wherein the cement tool comprises an amplifier, inducing cement in the casing, wherein inducing the cement pulls the bottom fiber optic line into an annulus of the wellbore, deploying a top seal to the cement tool in the casing, wherein a top fiber optic line is coupled to the top seal of the cement tool, applying a downward pressure on the cement by the top seal that forces the cement to flow through the bottom seal into an annulus of the wellbore, inducing the bottom fiber optic line into the annulus, mating the top seal and the bottom seal, inducing an optical signal through the top fiber optic line, wherein the optical signal is induced from a light source, amplifying the optical signal by the amplifier, wherein the optical signal flows through the top fiber optic line and the bottom fiber optic line, receiving a sensing measurement signal associated with a downhole parameter, wherein the sensing measurement signal traverses the bottom fiber optic line to the top fiber optic line, and adjusting one or more operational parameters based at least in part on the received sensing measurement signal. In one or more embodiments, an information handling system coupled to the top fiber optic line receives the sensing measurement signal. In one or more embodiments, a fiber optic interrogation system coupled to the top fiber optic line receives the sensing measurement signal. In one or more embodiments, the top seal comprises the amplifier. In one or more embodiments, the bottom seal comprises the amplifier. In one or more embodiments, the amplifier comprises a first amplifier and a second amplifier, and wherein the top seal comprises the first amplifier and the bottom seal comprises the second amplifier. In one or more embodiments, the amplifier comprises a doped fiber and an amplified spontaneous emission (ASE) filter. In one or more embodiments, the amplifier amplifies the sensing measurement signal.

In one or more embodiments, a method comprises generating, by a light source, an optical signal, transmitting, by a first fiber optic line coupled to a cement tool, the optical signal to a second optical line coupled to a cement tool, wherein the second optical line extends into an annulus of a wellbore, amplifying, by an amplifier of the cement tool, the optical signal, detecting, by a receiver, a sensing measurement signal, wherein the sensing measurement signal is associated with a downhole parameter, adjusting a cementing operation based, at least in part, on the sensing measurement signal. In one or more embodiments, the method further comprises an information handling system coupled to the first fiber optic line, wherein the information handling receives the sensing measurement signal. In one or more embodiments, the method further comprises a fiber optic interrogation system coupled to the first fiber optic line, wherein the fiber optic interrogation system transmits the sensing measurement signal to an information handling system. In one or more embodiments, the amplifier comprises a doped fiber and an amplified spontaneous emission (ASE) filter.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a cementing tool positionable within a casing string of a wellbore, wherein the cementing tool comprises a top seal and a bottom seal, and wherein the top seal and the bottom seal are configured to be mated;

an amplifier coupled to the cementing tool;
a top fiber optic line coupled to the top seal, wherein the top fiber optic line couples to the bottom seal when the top seal and the bottom seal are mated, wherein the top fiber optic line is dispensed by a first fiber optic dispenser at a first end of the top fiber optic line and a second fiber optic dispenser at a second end of the top fiber optic line, wherein a tension required in the top fiber optic line to dispense from the first fiber optic dispenser is lower than the tension required in the top fiber optic line to dispense from the second fiber optic dispenser;
a bottom fiber optic line coupled to the bottom seal, wherein the bottom fiber optic line is carried into an annulus by a flow of cement into the wellbore;
a light source, wherein the light source generates a source optical signal through the top fiber optic line, wherein the amplifier amplifies the source optical signal, and wherein the amplified source optical signal flows through the bottom fiber optic line when the top seal and the bottom seal are mated; and
a receiver for receiving a sensing measurement signal transmitted from the bottom fiber optic line to the top fiber optic line, wherein the sensing measurement signal is associated with a downhole parameter.

2. The system of claim 1, further comprising an information handling system coupled to the top fiber optic line, wherein the information handling receives the sensing measurement signal.

3. The system of claim 1, further comprising a fiber optic interrogation system coupled to the top fiber optic line, wherein the fiber optic interrogation system transmits the sensing measurement signal to an information handling system.

4. The system of claim 1, wherein the top seal comprises the amplifier.

5. The system of claim 1, wherein the bottom seal comprises the amplifier.

6. The system of claim 1, wherein the amplifier comprises a first amplifier and a second amplifier, and wherein the top seal comprises the first amplifier and the bottom seal comprises the second amplifier.

7. The system of claim 1, wherein the amplifier comprises a doped fiber and an amplified spontaneous emission (ASE) filter.

8. The system of claim 1, wherein the amplifier amplifies the sensing measurement signal.

9. A method of cementing a wellbore using a cement tool, the method comprising:
deploying a bottom seal of the cement tool in a casing of the wellbore, wherein the bottom seal is coupled to a bottom fiber optic line, and wherein the cement tool comprises an amplifier;
inducing cement in the casing, wherein inducing the cement forces the bottom fiber optic line into an annulus of the wellbore;
deploying a top seal of the cement tool in the casing, wherein a top fiber optic line is coupled to the top seal of the cement tool, wherein the top fiber optic line is dispensed by a first fiber optic dispenser at a first end of the top fiber optic line and a second fiber optic dispenser at a second end of the top fiber optic line, wherein a tension required in the top fiber optic line to dispense from the first fiber optic dispenser is lower than the tension required in the top fiber optic line to dispense from the second fiber optic dispenser;
applying a downward pressure on the cement by the top seal that forces the cement to flow through the bottom seal into an annulus of the wellbore;
mating the top seal and the bottom seal;
inducing an optical signal through the top fiber optic line, wherein the optical signal is induced from a light source;
amplifying the optical signal by the amplifier, wherein the optical signal flows through the top fiber optic line and the bottom fiber optic line;
receiving a sensing measurement signal associated with a downhole parameter, wherein the sensing measurement signal traverses the bottom fiber optic line to the top fiber optic line; and
adjusting one or more operational parameters based at least in part on the received sensing measurement signal.

10. The method of claim 9, wherein an information handling system coupled to the top fiber optic line receives the sensing measurement signal.

11. The method of claim 9, wherein a fiber optic interrogation system coupled to the top fiber optic line receives the sensing measurement signal.

12. The method of claim 9, wherein the top seal comprises the amplifier.

13. The method claim 9, wherein the bottom seal comprises the amplifier.

14. The method of claim 9, wherein the amplifier comprises a first amplifier and a second amplifier, and wherein the top seal comprises the first amplifier and the bottom seal comprises the second amplifier.

15. The method of claim 9, wherein the amplifier comprises a doped fiber and an amplified spontaneous emission (ASE) filter.

16. The method of claim 9, wherein the amplifier amplifies the sensing measurement signal.

17. A method comprising:
generating, by a light source, an optical signal;
transmitting, by a first fiber optic line coupled to a cement tool, the optical signal to a second optical line coupled to the cement tool, wherein the second optical line extends into an annulus of a wellbore, wherein the first fiber optic line is dispensed by a first fiber optic dispenser at a first end of the first fiber optic line and a second fiber optic dispenser at a second end of the first fiber optic line, wherein a tension required in the top fiber optic line to dispense from the first fiber optic dispenser is lower than the tension required in the top fiber optic line to dispense from the second fiber optic dispenser;
amplifying, by an amplifier of the cement tool, the optical signal;
detecting, by a receiver, a sensing measurement signal, wherein the sensing measurement signal is associated with a downhole parameter; and
adjusting a cementing operation based, at least in part, on the sensing measurement signal.

18. The method of claim 17, further comprising an information handling system coupled to the first fiber optic line, wherein the information handling receives the sensing measurement signal.

19. The method of claim 17, further comprising a fiber optic interrogation system coupled to the first fiber optic line, wherein the fiber optic interrogation system transmits the sensing measurement signal to an information handling system.

20. The method of claim 17, wherein the amplifier comprises a doped fiber and an amplified spontaneous emission (ASE) filter.

* * * * *